United States Patent
Sullivan et al.

(10) Patent No.: US 7,631,101 B2
(45) Date of Patent: Dec. 8, 2009

(54) SYSTEMS AND METHODS FOR DIRECTION OF COMMUNICATION TRAFFIC

(75) Inventors: Alan T. Sullivan, Leesburg, VA (US); Mark Lewyn, Washington, DC (US); Phillip Gross, Purcellville, VA (US)

(73) Assignee: Paxfire, Inc., Sterling, VA (US)

( * ) Notice: Subject to any disclaimer, the term of this patent is extended or adjusted under 35 U.S.C. 154(b) by 0 days.

(21) Appl. No.: 11/555,386

(22) Filed: Nov. 1, 2006

(65) Prior Publication Data

US 2007/0038729 A1    Feb. 15, 2007

Related U.S. Application Data

(63) Continuation of application No. 10/837,614, filed on May 4, 2004.

(60) Provisional application No. 60/467,246, filed on May 5, 2003.

(51) Int. Cl.
*G06F 15/16* (2006.01)
*G06F 15/173* (2006.01)
*G06F 11/00* (2006.01)

(52) U.S. Cl. .................. 709/245; 709/203; 709/238; 714/25

(58) Field of Classification Search ............... 709/245, 709/238–244, 203; 714/25
See application file for complete search history.

(56) References Cited

U.S. PATENT DOCUMENTS

| | | | |
|---|---|---|---|
| 5,794,210 A | 8/1998 | Goldhaber et al. | |
| 5,974,451 A | 10/1999 | Simmons | |
| 6,006,197 A | 12/1999 | D'Eon | |
| 6,009,459 A * | 12/1999 | Belfiore et al. | 709/203 |
| 6,070,185 A | 5/2000 | Anupam et al. | |
| 6,092,100 A * | 7/2000 | Berstis et al. | 709/203 |
| 6,134,680 A * | 10/2000 | Yeomans | 714/57 |
| 6,332,158 B1 | 12/2001 | Risley et al. | |
| 6,339,761 B1 | 1/2002 | Cottingham | |
| 6,526,450 B1 * | 2/2003 | Zhang et al. | 709/245 |
| 6,564,243 B1 | 5/2003 | Yedida et al. | |
| 6,594,697 B1 * | 7/2003 | Praitis et al. | 709/225 |
| 6,615,237 B1 * | 9/2003 | Kyne et al. | 709/203 |
| 6,760,746 B1 | 7/2004 | Schneider | |
| 6,968,313 B1 | 11/2005 | Oran | |
| 7,010,537 B2 | 3/2006 | Eyal et al. | |
| 7,010,568 B1 | 3/2006 | Schneider et al. | |
| 7,016,958 B1 * | 3/2006 | Aviani et al. | 709/224 |
| 7,110,399 B2 | 9/2006 | Banerjee et al. | |
| 7,246,133 B2 | 7/2007 | Velasco et al. | |
| 2002/0009079 A1 | 1/2002 | Jungck et al. | |
| 2002/0013844 A1 | 1/2002 | Garrett et al. | |
| 2002/0032766 A1 * | 3/2002 | Xu | 709/223 |
| 2002/0055848 A1 * | 5/2002 | Jae et al. | 705/1 |

(Continued)

*Primary Examiner*—Jeffrey Pwu
*Assistant Examiner*—Guang Li
(74) *Attorney, Agent, or Firm*—Latimer & Mayberry IP Law, LLP

(57) ABSTRACT

An Internet traffic redirection architecture is disclosed that allows for directing of trash traffic to specified sites. The system or method allows a controller, such as an ISP, to benefit from mistyped Internet addresses so that participating partners of the ISP are presented to the customer when the requests a web site that is not found or does not exist. The system decreases lost traffic by means of capturing unresolved "trash" traffic on the Internet and redirecting said traffic to a search engine partner and/or other partners.

14 Claims, 7 Drawing Sheets

Overall Architecture

U.S. PATENT DOCUMENTS

| | | |
|---|---|---|
| 2002/0065842 A1* | 5/2002 | Takagi et al. ................. 707/500 |
| 2002/0165972 A1 | 11/2002 | Chien et al. |
| 2003/0014539 A1 | 1/2003 | Reznick |
| 2003/0014759 A1 | 1/2003 | Van Stam |
| 2003/0018726 A1* | 1/2003 | Low et al. ................... 709/206 |
| 2003/0110161 A1 | 6/2003 | Schneider |
| 2003/0135548 A1* | 7/2003 | Bushkin ..................... 709/203 |
| 2003/0149787 A1 | 8/2003 | Mangan |
| 2003/0231754 A1* | 12/2003 | Stein et al. ............. 379/211.02 |
| 2003/0233328 A1 | 12/2003 | Scott et al. |
| 2003/0236729 A1 | 12/2003 | Epstein et al. |
| 2004/0030780 A1* | 2/2004 | Walters ....................... 709/225 |
| 2004/0044566 A1* | 3/2004 | Bostelmann et al. .......... 705/14 |
| 2004/0083283 A1 | 4/2004 | Sundarem et al. |
| 2005/0015512 A1 | 1/2005 | Kale et al. |
| 2005/0065806 A1* | 3/2005 | Harik ............................. 705/1 |
| 2005/0135264 A1 | 6/2005 | Popoff et al. |
| 2005/0198068 A1 | 9/2005 | Mukherjee et al. |
| 2005/0235044 A1* | 10/2005 | Tazuma ..................... 709/217 |
| 2006/0218242 A1 | 9/2006 | Tock et al. |

* cited by examiner

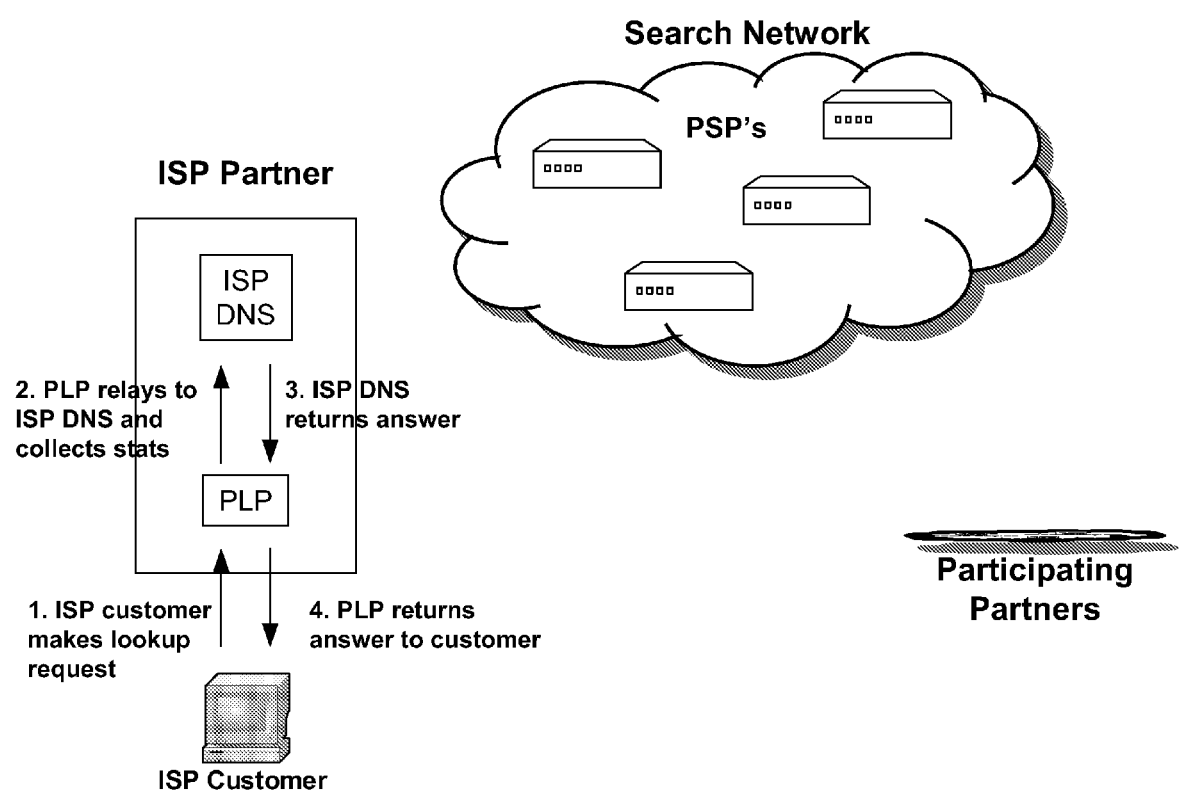
FIG. 1 - Normal Customer DNS Request

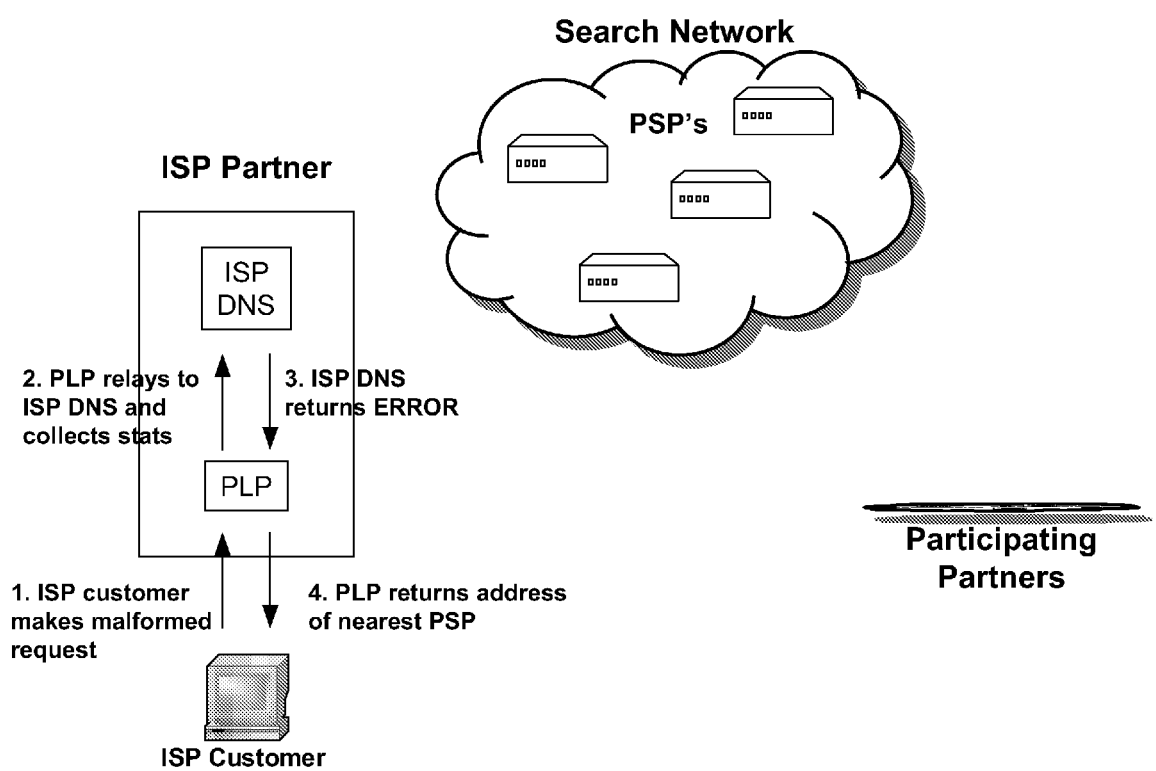
FIG. 2 - Customer Makes Malformed Request

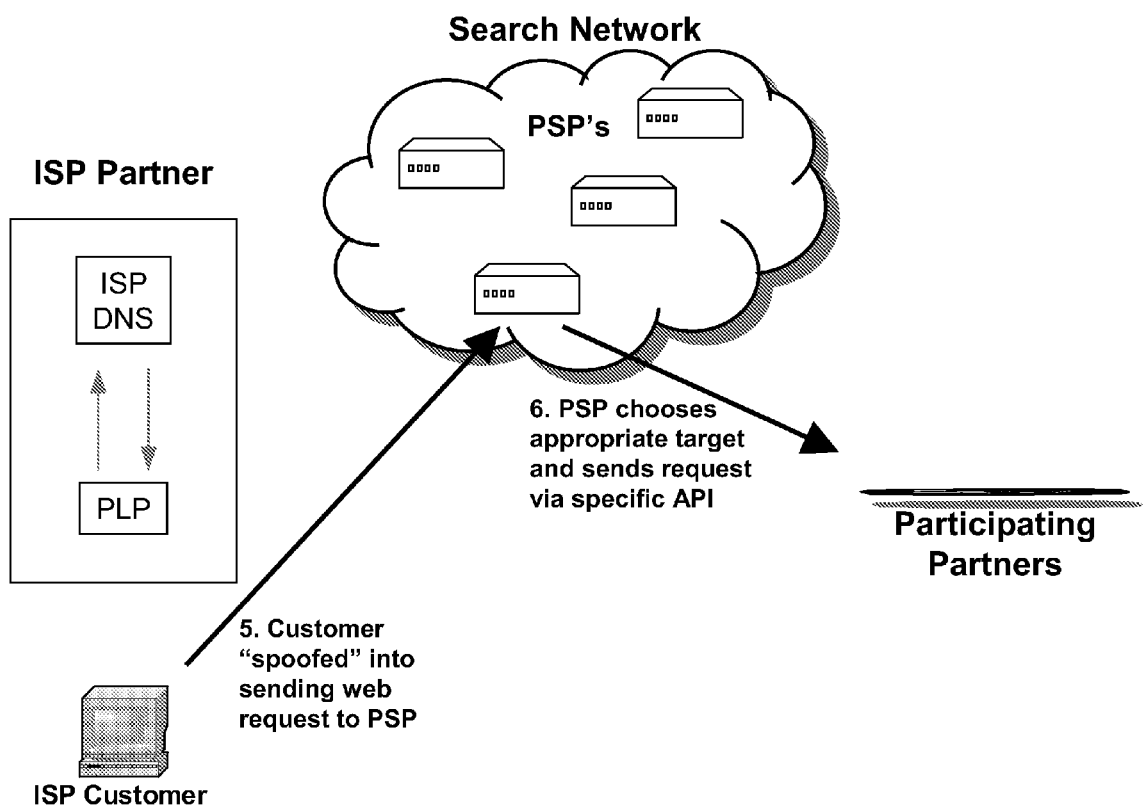
FIG. 3 - Customer Sends Web Request To PSP

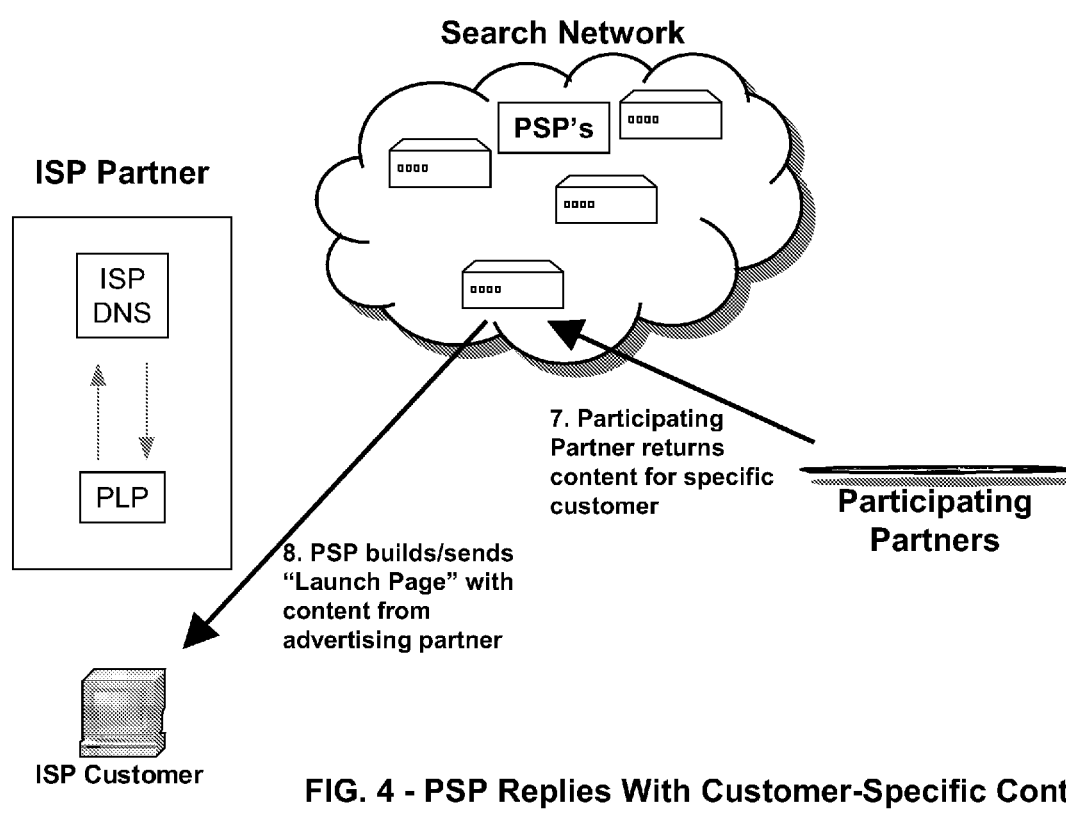
FIG. 4 - PSP Replies With Customer-Specific Content

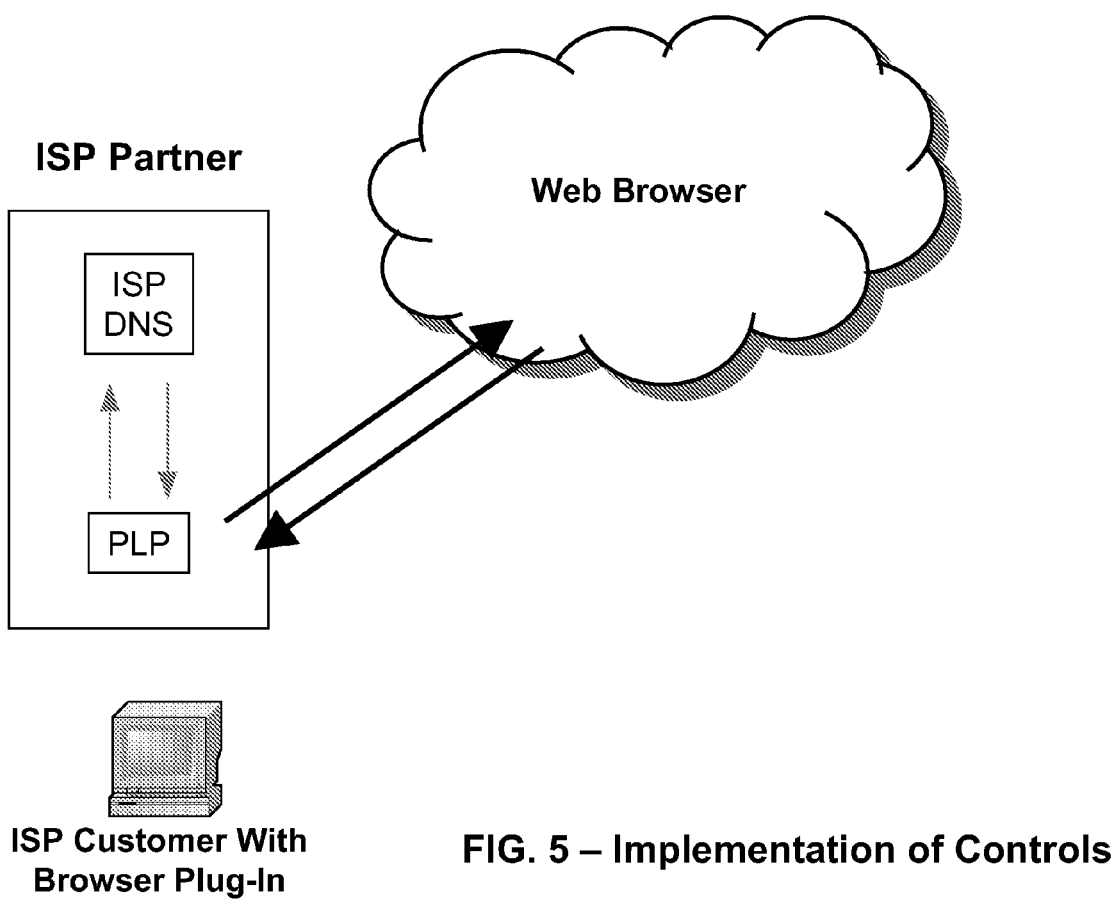
FIG. 5 – Implementation of Controls

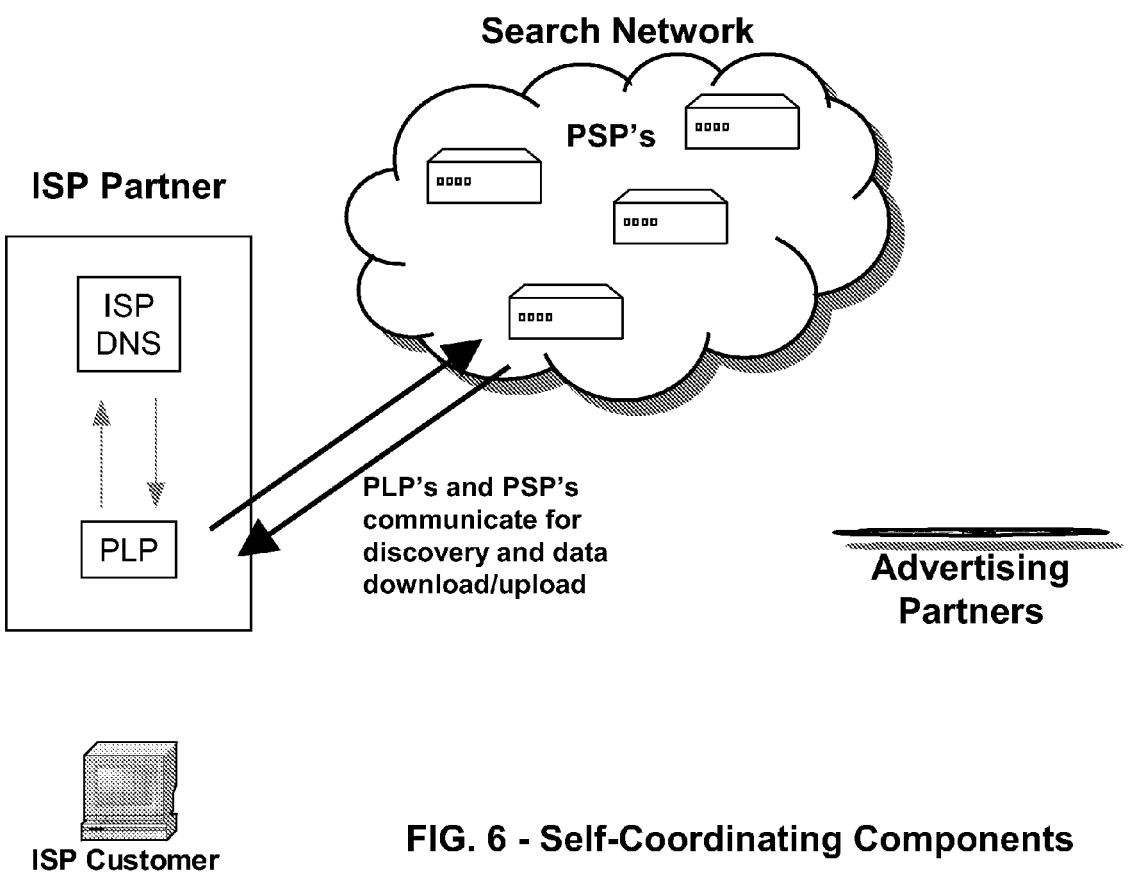
FIG. 6 - Self-Coordinating Components

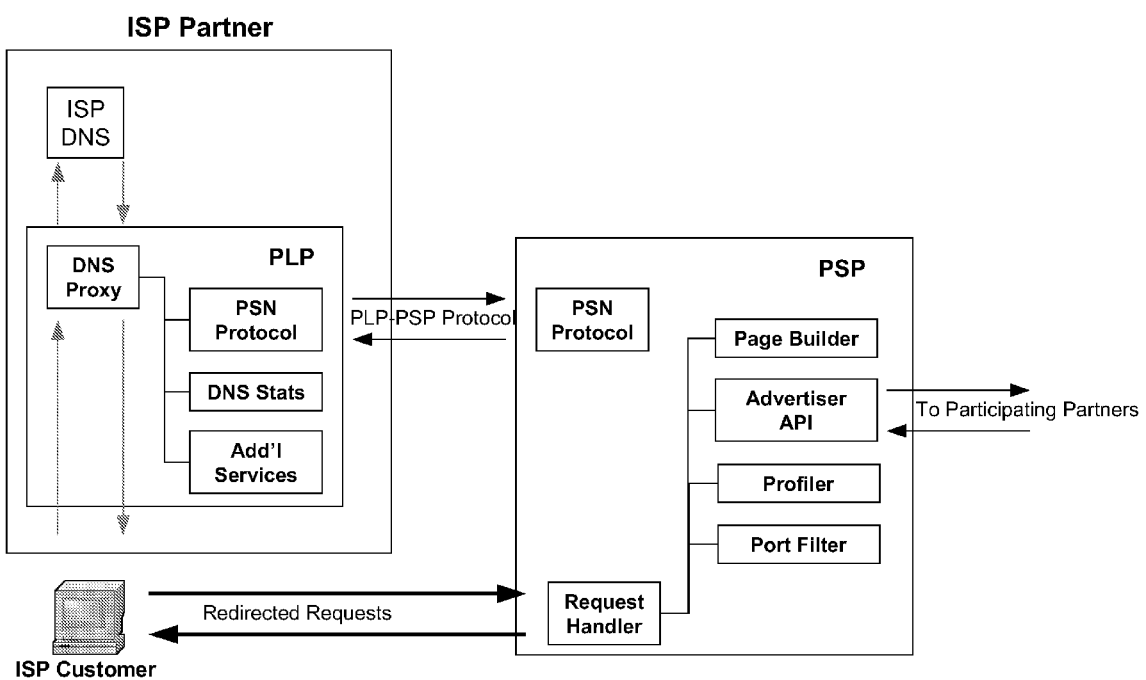
FIG. 7 – Overall Architecture

SYSTEMS AND METHODS FOR DIRECTION OF COMMUNICATION TRAFFIC

CROSS-REFERENCE TO RELATED APPLICATIONS

This application is a continuation of U.S. patent application Ser. No. 10/837,614, filed 4 May 2004, which claims the benefit of U.S. provisional patent application No. 60/467,246, filed May 5, 2003, the entire disclosures of both of which are hereby incorporated by reference herein in their entireties.

BACKGROUND OF THE INVENTION

1. Field of the Invention

The present invention relates generally to traffic direction within a communications network. More specifically, the present invention relates to systems and methods for directing communication traffic to a specified location when an original location is not reachable.

2. Background of the Invention

Directing search traffic on the web is a common and lucrative process. For example, popular web browsers, such as Microsoft Internet Explorer, typically redirect misspelled and mistyped web pages on to the web browser's own personal incomplete search page, such as MSN Search. Such search pages provide the user with possible search options and advertising. The essence of the concept is that it captures the mistyped or misspelled traffic at either the browser level or application level. These methods lack the capability to function at the DNS level, thus limiting their overall functionality and ability to be able to provide business services.

Various methods of routing or redirecting traffic are known in the art. For example, methods of routing traffic are taught within U.S. Pat. No. 6,631,402. Methods of redirecting or routing of data traffic are taught within U.S. Pat. No. 6,608,893, U.S. Pat. No. 5,933,490, U.S. Pat. No. 6,205,477, and patent application publication U.S. 2004/0042447 A1. Methods of routing error corrections are taught within U.S. Pat. No. 6,601,208. Routing methods for load balancing are taught within U.S. Pat. No. 6,182,139 and U.S. Pat. No. 5,774,660. Internet traffic routing is taught within U.S. Pat. No. 5,987,611. Methods for dealing with invalid requests are taught within patent application publication U.S. 2004/0030780 A1.

Likewise, methods of marketing and traffic selling are known. For example, such methods are taught within patent application publication U.S. 2004/0044566 A1. URL (uniform resource locator) redirect methods are taught within patent application publication U.S. 2004/004622 A1. DNS (domain name server/service) resource lookup methods are taught within patent application publication U.S. 2004/0044791 A1. Methods of implementing a web-based proxy are taught within U.S. Pat. No. 6,631,402.

Although there are numerous drawbacks to the systems and methods currently available, a drawback of conventional redirect methods is that they lack the ability to perform service task at the DNS level of operation, thus limiting the functionality and capability of such methods.

Furthermore conventional redirect methods are diminished in capacity due to the level at which these elements operate within the Internet infrastructure or Internet architecture, thus limiting the ability of conventional redirect methods in conducting reliable business services, such as payment processing, e-commerce, ENUM, IP telephony, VoIP, filtering, security, URL forwarding, and associated tracking methods, such as market channel tracking, webpage usages, DNS statistics, traffic redirection, and information storage or backup.

Thus there is a need in the art for a method of traffic direction or redirection that is not limited in the level at which it is able to function and allows for conducting reliable business services and associated tracking methods.

SUMMARY OF THE INVENTION

The present invention provides systems and methods for redirection of improper or incorrect requests. The system and methods redirect such requests to a proxy host, which analyzes the erroneous request and provides a context-relevant search result rather than an error message. The methods and systems reside at the service provider level (i.e., at the DNS or ISP level) rather than the user level.

The present invention accordingly provides systems and methods for conducting business using computers. The systems and methods include identifying queries containing errors and redirecting these erroneous queries to web pages that contain relevant information, which can be provided by advertisers who pay the ISP or DNS operator for inclusion of their content on the redirect web page.

BRIEF DESCRIPTION OF THE DRAWINGS

FIG. 1 shows a request and response generated in accordance with an exemplary embodiment of the invention with no traffic direction initiated.

FIG. 2 shows an exemplary implementation of controls used to implement the direction method when a malformed request is initiated.

FIG. 3 shows an implementation of controls used to implement the direction method in accordance with an exemplary embodiment of the present invention wherein a spoof request is initiated.

FIG. 4 shows an implementation of controls used to implement the direction method in accordance with an exemplary embodiment of the present invention wherein a response to the spoof request is supplied to the customer.

FIG. 5 shows an implementation of controls used to implement the direction method in accordance with the invention wherein the use of local plug-ins is initiated.

FIG. 6 shows an implementation of the direction method in accordance with an exemplary embodiment of the present invention wherein two components of the invention, the Lookup Proxy (PLP) and the Search Profiler (PSP), exchange information and control data.

FIG. 7 shows an implementation of the overall architecture used to implement the direction system and method in accordance with an exemplary embodiment of the present invention.

DETAILED DESCRIPTION OF THE INVENTION

The Internet provides a user a quick and efficient direction to a particular web site if the user knows the exact web site address. The majority of Internet users properly type in the exact address of the web site that they are seeking and thus are directed to such sites. However, a user will quite often type in an address that is not recognized, thereby leading the user to an error page or a specific search engine page. Such undesired direction of the user is considered as unwanted, unused or unresolved traffic. Another popular name for URL addresses that lead to no proper destination is "trash traffic".

The present invention offers a recycling solution to trash traffic by directing such trash traffic to a particular predetermined location. Such predetermined location may be a search engine or an advertising page or some combination of both or other page that allows the controller to benefit from the redirection of the user traffic. Such a controller may be, for example, an ISP. The limitations and difficulties in the current state of the art in the area of redirecting network traffic are addressed by the present invention, which reside in the systems and methods for the direction of trash traffic and resulting production of capital for various applications.

The systems and methods according to the present invention are suitable for use in any computer-driven communications system, such as Internet systems and telephony. As such, the present methods and systems can be implemented at the DNS or ISP level.

The exemplary systems and methods according to the present invention will provide a more robust experience for the Internet user allowing the local computer to conduct other tasks. As providers of DNS service begin redirecting more traffic away from browser providers, they will look for the IP address of the redirect host that is being returned through the DNS, or domain name system. Once the DNS service providers know that information, they will replace that IP address with their own redirect host. This will enable them to recapture the traffic. The invention as described herein provides a way to eliminate the need to redirect lost or trash traffic at the application level but to do so at the DNS level. This will eliminate companies from being able to filter a single IP address because multiple IP addresses will be returned from a pool of IP addresses from network of machines.

An issue in Internet traffic redirection design is the communications between the customer and ISP. Conventional systems and methods are relatively inflexible with respect to the manner in which they generate the required code transfers for such rerouting or redirecting of Internet traffic at the DNS level of operation.

Exemplary systems and methods in accordance with the present invention are accomplished by incorporating the use of a unique means of traffic direction or redirection, being used synonymously herein and through this application, wherein the use of DNS level protocols is applied in a manner that creates advantages over conventional redirect systems. This is accomplished by integrating redirection instruction software, labeled as Lookup Proxy ("PLP"), within the ISP server machines wherein lost traffic is thus converted into profit for the ISPs through direction of traffic to a predetermined web site. Such profits may be distributed through participating partners and/or stored for later use in an online account when the customer can take action, thus increasing the overall efficiency of the monetary exchange system and adding stability and safety to the customers funds.

Moreover, it has been discovered that other features present have applications to reduce computer usage at the customer level by using the infrastructure in such a way that when a query occurs, there is minimal impact upon the end user and greatly minimized computer usage required by the end customer thus improving the efficient use of the Internet infrastructure. There is an added benefit in that when the query is initiated there is a seamless integration with the entire network.

Although the present disclosure is directed to Internet trash traffic as an example, the present invention is not limited to this exemplary embodiment. Other communication direction is also within the purview of the present invention. For example, in an exemplary embodiment of the present invention as applied to the field of telephony, unused traffic might be a misdialed phone number that may then be redirected to a telemarketer or other location or for other services, such as a directory function. In the area of Instant Messaging (IM), unused traffic may be generated, for example, by someone who typed in an incorrect "screen name". That mistyped screen name may then be redirected to an advertiser who might flash up a message and/or link or to another location or for other services, such as a directory function.

If processed correctly, unwanted, unused and/or unresolved traffic would be a very valuable business resource to those seeking such traffic. Indeed, many Internet registries and corporate web sites are unaware that they possess this valuable business asset. Today, they view this traffic as the World Wide Web equivalent of "trash". But, as with many industries, "trash" can often be recycled and turned into new products. One way to do that is by means of directing such unwanted, unused and/or unresolved traffic.

The systems and methods for which traffic can be identified as "unwanted", "unused", or "unresolved" within the World Wide Web may be accomplished by several means, which will be described herein.

At the DNS level of the Internet infrastructure, a registry, such as, for example, VeriSign, would look at the internet traffic by considering what the customer has typed into the web browser and then see if there is a domain name associated with what the customer has typed in. If there is no such domain name, then the traffic would be classified as "unresolved" and made available to be redirected wherein such a system or method could be implemented at the ISP level and/or web browser level.

Corporate web sites could identify traffic as unwanted through a number of means. A corporate web site, for instance, may define traffic from overseas as "unwanted" if it were not profitable to ship overseas. Thus, one could identify if the traffic came from overseas by analyzing the IP address. Alternatively, a web site owner might only want traffic at certain times, and not at other times and/or geographic location. Thus, such traffic could be sorted by time and/or geographic location wherein such specified portions could be identified and made available as redirected traffic.

In the area of telephony, unwanted telephone traffic might take the form of a misdialed phone number or a misdirected Internet call. Or, perhaps, the person typed in the right telephone number, but there is no person associated with that number or they may no longer work there or have a different phone number. In either case, that piece of telephone traffic could be redirected, perhaps to a telemarketer or to someone within the company that the person is trying to contact, or an outside company to where the person may have transferred. Other options are also possible.

In the instant messaging (IM) world, an "unresolved" piece of traffic would be, for example, a piece of traffic for which there is no screen name associated such as when a customer types in a screen name that doesn't exist. If it cannot be resolved in the IM database, then the traffic is identified as unresolved and thus may be redirected, and a marketing message and/or website link can be delivered to the consumer.

As shown and described, many possible examples exist for the directing or redirecting of electronic communication signals that are not able to find their intended targets. Although many such forms exist, with non-limiting examples being described above in terms of Internet traffic, telephone calls and the like, the examples described herein are provided with respect to lost Internet traffic for sake of simplicity. However, the concepts and architecture is the same with other forms of electronic communication and thus the present invention has a scope that encompasses all electronic communication, beyond that for lost Internet traffic as described in the following series of figures.

An exemplary embodiment of the present invention is shown in FIG. 1, wherein a system or method of the DNS Proxy (PLP) is shown in the example where an Internet address is properly typed in and located. As is illustrated, an ISP customer sends a request 1 for an IP address lookup to the PLP, which then relays a message 2 to the ISP DNS. The DNS collects the necessary statistics relating to the specific Internet address requested by the user and returns 3 the IP address requested with a domain name that is resolved to the PLP. The PLP returns 4 the requested IP address to the ISP customer. In such a system or method, the DNS proxy will collect information and statistics about all DNS requests made to the ISP DNS thus building a database for said system and method.

However, as is often the case, an Internet user does not properly type in a desired Internet address. FIG. 2. shows an example of a malformed DNS request in which a redirect IP address is returned from the nearest PSP node. The ISP customer makes a malformed request for an address lookup 1. The PLP relays 2 the malformed request to the ISP DNS and collects statistical data in a data base then the ISP DNS returns 3 an error such as "no such address". Then the PLP returns 4 an IP address of the nearest PSP such that the ISP customer receives a redirect IP address to this request instead of a DNS error of "no such address".

Following the sequences shown in FIG. 2 are a series of events according to the present invention, as shown in FIG. 3. This is an example of the events after the customer receives the redirect IP address from the nearest PSP node. After a malformed DNS request 1,2, the customer will use the redirect IP address 3,4 to send 5 a web request to a PSP node which acts as a web server. The PSP web server will dynamically create 6 a web landing page with a search bar included in the landing page wherein the web landing page will be returned to the customer. In the usual case, the customer will be assured of sending only web requests to the PSP by actions of the browser plug-in, referred to as the Search Manager (PSM). However, if the customer is not using the PSM, or if for any other reason a non-web request is sent to a PSP, the PSP will filter out the non-web traffic and return an error response appropriate for the request.

Based on the type of inquiry that is being made, FIG. 4 shows how the PSP will return customer specific content based upon the profile stored for that customer or ISP. The participating partner, which could be an advertising partner or search engine partner, returns 7 content for the specific customer. This can be done through a common API to the advertisers or search engines. The PSP builds 8 and sends a launch page with content from advertising partner or search engine. This launch page is built in real time based upon profile information stored for the ISP or based upon the IP address of the requestor. The IP address may be used to localize the requester all the way down to a known individual user.

FIG. 5. shows how the ISP uses a web browser to communicate with the PLP DNS proxy for the purpose of configuring and managing the DNS proxy 3 and the status of the PLP DNS proxy is returned 4. The customer uses a browser plug-in 1 for being redirected by the PLP directly from the browser 2. The web browser also allows the ISP to configure other components including the ISP profile contained at the PSP. The customer uses a browser plug-in 1 for being redirected by the PLP directly from the browser 2. The browser plug-in is optional and can be used for either an opt-in or opt-out of the redirect function.

In order to keep its records continuously updated, FIG. 6 shows how the PSP provides a mechanism for communicating with the PLP DNS proxy and the PLP DNS proxy platform 1,2. This may be used for updates 1,2 and self-coordination between the PLP and PSP 1,2. This update may be initiated by the PSP or PLP, automatically or initiated by the PLP or PSP. The updates further may be module, software, or data updates. They may also be used to deploy new PLP service modules. The data that the PSP provides to the PLP includes the IP address which is to be returned when an unresolved domain name request is made.

As shown in the exemplary sequences of FIGS. 1-6, the ISP information directing methods and systems according to the present invention involve a number of components. FIG. 7 is a description of the components of the PLP platform and an individual PSP platform. A key aspect of the PLP/PSP/PSM architecture is that the PLP is a general purpose software engine which can also run other software modules to deliver other services at this infrastructure level.

DNS Proxy intercepts DNS requests at port 53 and passes on those requests to the DNS of the ISP. If an error is returned by the DNS, the DNS proxy will return an IP address of the PSP node.

The PSN protocol module is what communicates between the PLP and PSP. This allows real-time data updates between the PLP and PSP. The PLP can send information, such as, for example, DNS stats, status, information about the owner of IP addresses, status and information from additional service modules. The PSN can add new servers modules to the PLP, can update the PLP software, can return responses to queries, can return the IP addresses to be returned in place of error messages from the DNS.

The DNS Stats module collects statistics about the DNS requests and status of the requests. It can collect those stats or send that information to the PSP via the PSN protocol module. Additional services modules can be added to the PLP. The PSP Request Handler handles the request from ISP customers when they are directed to an error landing page. The request handler employs the Port Filter to filter out any non-HTTP protocol or other port requests other than HTTP. The Profiler is used to define the look and feel and layout of a landing page. It can contain profile information about the ISP or the customer. The Page Builder module builds the PSP landing page in real-time in response to the profile of either the user, the ISP, or both that are stored in the Profiler.

For example, an integral component, which will run as a module in the general purpose software engine, is the collection and analysis of DNS and other traffic. This opens opportunities to partner with researchers and ISPs to study Internet performance. With the PLP/PSP/PSM technology widely distributed at participating ISPs, the general purpose software engine of the PLP architecture will make it possible to deliver additional services such as "DNS forwarding" for known changes to DNS names, "URL filtering" to control access to undesirable web sites, detection and diagnosis of DDOS attacks, and detection and diagnosis of Spam sources.

A failed-lookup service is useful to customers. Customers will be given appropriate controls (e.g., opt-out feature). The technical model shown and described assures other applications work as expected. The model creates opportunities for other useful services for customers. This model creates a network uniquely positioned to instrument and study Internet performance dynamics. It is not a rigidly enforced mechanism and offers complete choice to the user; ISPs can participate without redirection (e.g., for other services) or ISP customers have choice to opt-out. The options are in place for both the customer and the ISP.

In a preferred embodiment, for simple traffic redirection, the system can identify a piece of unwanted, unused or unresolved traffic and point it to a particular location, such as a search engine and/or any IP address and/or any IP address of a web server and/or any IP address of any server for any port or protocol. Other options are also possible and are left to the controller of the system and method as described herein.

In a preferred embodiment for use with traffic direction and processing, the traffic is processed before it is redirected. Such processing may, for example, include identifying or approximating the location and/or demographics of the entity that initiated the traffic. This may be accomplished, for example, using geo-location and/or demographic analysis. The IP address of the requestor may be discovered ahead of time by any ISP that delegates either a static IP address or uses a dynamic means such as DHCP to delegate an IP address to a particular user. When the secondary request is made, for example another web landing page, the identity of the user can then be determined by the IP address of the requester to bind a particular DNS request with a particular requester.

In another exemplary embodiment, traffic is offered on an exchange that would allow potential buyers to bid on the traffic before it is redirected. This embodiment can involve simple traffic redirection, in which case the traffic can be sold on an individual basis or in bulk, for example. Alternatively, this embodiment can involve a processing step allowing the traffic to be classified by one or more criteria such as geographic location and/or demographics for the purpose of selling the traffic to parties interested in receiving such traffic from a particular location and/or demographic.

A variety of different systems and methods may be employed within the scope of the present invention to both identify unwanted, unused or unresolved traffic and to redirect such traffic, once identified as such.

Exemplary systems and methods according to the present invention have a variety of industrial and corporate uses. In one non-limiting example in the corporate arena, World Wide Web merchants receive a significant amount of traffic that they do not want or need. For instance, any traffic a merchant received from overseas is worthless to him if it's unprofitable or illegal for that merchant to ship its product overseas. Another use area includes World Wide Web registries, which help direct traffic from a customer to its final destination on the World Wide Web, which frequently cannot figure out where to send a unit of traffic. This traffic may be classified as unresolved traffic. This happens billions of times a day on the World Wide Web.

In one non-limiting every day example, an average Internet user who is seeking out a dentist with a distinct web address may accidentally type in the wrong address. The exemplary systems and methods of the present invention may then determine that the wrong address is a result of the user's interest in seeking out a dentist. An advantage of the present invention is that the exemplary system then determines the general location of the computer of the user, for example through zip code. Then the exemplary system does a search of all dentists in its participating (advertising) partner database to determine which are available in the zip code of the particular user. The system then presents the user with a web page of information that relate to dentists in the same zip code. Although the user types in the wrong email address relating to a particular dentist, the ISP provider was able to provide the user with a list of dentists in the user's area. This service is beneficial for the user who is seeking a dentist (and may have been seeking one who is closer or more economical), the ISP provider (who gains from the advertising costs), and the dentist (who has paid for advertising to the ISP and is now having customers directed to him).

Other similar examples are limitless and within the scope of the present invention. For example, misdialed telephone calls may operate under the same structure, providing the caller with additional options other than the party that the caller had intended to call (but whose number the caller misdialed).

Yet another example involves broken links. There are literally billions of links on the web that are "broken", meaning that when a consumer clicks on the link, he doesn't end up where he intended, but, rather, on an "error" page. These broken links can be collected and then the traffic they generate can be redirected to another place, perhaps a related page.

Yet another example includes parked domains. "Parked" domains are domains that have been registered by a consumer or business, but for which there is no web site attached by the registered owner of that domain. These parked domains are typically maintained by the "Registrars" that sold the domain. Even though there is no website attached to these domains, they still generate traffic. This traffic can be redirected to another place.

Many other uses are possible. These include:

(1) the instant after a query is made. Redirecting traffic from one supplier of traffic to one buyer of traffic. This may be called "one-to-one" business system;

(2) redirecting traffic from one supplier to many buyers. This may be called "one to many" business system;

(3) redirecting traffic from many suppliers to many buyers of traffic. This may be called "many to many" business system;

(4) any combination of the above embodiments may be used in addition to that of current systems currently used, thus aiding the usefulness of current system as well as reducing the associated maintenance cost by reducing the rate of misguided request.

Further advantages of the invention are to reduce overhead usage of the components involved in the end users computer system, add stability to the Internet infrastructure structure, and increase reliability, while reducing the needed maintenance associated with current internet redirect systems. An advantage of the exemplary embodiments of the present invention is that they provide means for recovering unresolved traffic and converting such traffic into money for the ISPs and/or participating business partners. Another result of exemplary embodiments of the invention is to provide a system or method for Internet traffic redirection, which permits a myriad of services to be implemented to the customer directly through the ISP and/or participating partner.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. For example, the principles of the invention in their broader aspects may be applied to other network systems such as for telephony. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

The invention claimed is:

1. A method for directing communication, the method comprising:
   receiving a request from an Internet user for a specific website;
   relaying the request to a domain name system (DNS) server to determine the Internet address for the website;
   responding to the request by providing a response containing an Internet address when the requested Internet address for the website is resolved by the DNS;
   if an Internet address for the requested website is not resolved by the DNS, performing the following actions:
      determining if the request is a request other than one associated with the hypertext transfer protocol (HTTP) by intercepting the request at a name level;
         if the request is not associated with HTTP, forwarding to the Internet user an error response for the request;
         for all other requests:
            directing the Internet user to a predetermined search network and returning a contrived IP address for a web server landing page in place of the unresolved domain name request;
            choosing at least one appropriate target through the search network;
            sending a request for information to that at least one target;
            receiving from the at least one target the requested information; and
            providing a result page to the Internet user, the result page being a culmination of information received from the at least one target,
      wherein the actions that are performed when the requested website is not resolved by the DNS are not performed by the Internet user's computer.

2. The method of claim 1, wherein the targets are predetermined partners and associated with the DNS server.

3. The method of claim 1, wherein all steps occur within an Internet structure.

4. The method of claim 1, further comprising providing the Internet user the ability to opt-out of failed lookup redirection.

5. The method of claim 1, which is a method of controlling communication traffic, wherein said method provides one or more of the following services: DNS forwarding, URL filtering, DDOS attack detection, and SPAM source identification.

6. The method of claim 1, which is a method of controlling access by a user to an undesirable website, wherein said method further comprises:
   identifying an IP address, a URL, or both, corresponding to the undesirable website, wherein the IP address is provided by a DNS server connected to the Internet; and
   supplying to the user a different IP address than the IP address corresponding to the undesirable website,
   wherein the different IP address corresponds to a web page that provides the user content that is relevant to the query that resulted in return of the undesirable website IP address.

7. The method of claim 6, which is a method of URL filtering.

8. A computer system for direction of communication traffic, said system comprising:
   a server in the DNS;
   a first device that:
      receives and analyzes communications from a computer user and the DNS server; and
      determines if a communication is associated with a protocol other than HTTP, wherein, only if the communication is not associated with a protocol other than HTTP and is an unresolved, unwanted, unused, improper, or incorrect communication, communicates with a second device,
         if the request is not associated with HTTP, forwarding to the Internet user an error response for the request;
         for all other requests:
            directing the Internet user to a predetermined search network by returning a contrived IP address for a web server landing page in place of the unresolved domain name request;
            choosing at least one appropriate target through the search network;
            sending a request for information to that at least one target; and
            receiving from the at least one target the requested information; and
   a second device that creates the landing page for the computer user based on information supplied to it by the first device,
      wherein the landing page provides a culmination of information received from a communication from the first device relating to the requested information from the at least one target,
      wherein the information supplied by the first device is information indicating that the communication from the user was unresolved, unwanted, unused, improper, or incorrect, and wherein the information was obtained by intercepting the communication from the user at a name level, and
      wherein none of the DNS server, the first device, or the second device is the computer user's computer.

9. The computer system of claim 8, wherein the first device is interposed, within the communication pathway, between the user and the DNS, and wherein the first device is capable of intercepting and analyzing communications between the user and the DNS.

10. The computer system of claim 8, wherein the system comprises two or more second devices.

11. The computer system of claim 8, wherein the system is implemented at the ISP/DNS level of the Internet architecture, and not at the user level or the registry level.

12. The computer system of claim 8, wherein the first device is a general services sewer that can implement one or more computer applications.

13. The computer system of claim 8, wherein the first device and the DNS sewer are the same device.

14. The computer system of claim 8, which provides one or more of the following services: DNS forwarding, URL filtering, DDOS attack detection, and SPAM source identification.

* * * * *

UNITED STATES PATENT AND TRADEMARK OFFICE
CERTIFICATE OF CORRECTION

PATENT NO. : 7,631,101 B2
APPLICATION NO. : 11/555386
DATED : December 8, 2009
INVENTOR(S) : Alan T. Sullivan, Mark Lewyn and Phillip Gross It is certified that error appears in the above-identified patent and that said Letters Patent is hereby corrected as shown below:

Claim 12: column 10, line 55; change "sewer" to "server"

Claim 13: column 10, line 58; change "sewer" to "server"

Signed and Sealed this

Sixteenth Day of March, 2010

David J. Kappos
*Director of the United States Patent and Trademark Office*